United States Patent [19]

Soffa et al.

[11] Patent Number: 5,788,036
[45] Date of Patent: Aug. 4, 1998

[54] SYNCHRONIZING ARRANGEMENT FOR A GEAR TRANSMISSION

[75] Inventors: Franz Soffa, Burggen; Manfred Giese, Seefeld, both of Germany

[73] Assignee: Hoerbiger Antriebstechnik GmbH, Schongau, Germany

[21] Appl. No.: 734,956

[22] Filed: Oct. 23, 1996

[30] Foreign Application Priority Data

Oct. 30, 1995 [AT] Austria .................. 1786/95

[51] Int. Cl.⁶ ........................................ F16D 23/06
[52] U.S. Cl. .................. 192/53.34; 192/53.36; 192/110 R
[58] Field of Search .................. 192/53.3, 53.32, 192/53.34, 53.343, 53.36, 110 R; 74/339

[56] References Cited

U.S. PATENT DOCUMENTS 3,700,083 10/1972 Ashikawa et al. .
4,732,247 3/1988 Frost .
4,776,228 10/1988 Razacki et al. .............. 192/53.34 X
4,998,445 3/1991 Fujiwara .................. 192/53.34 X
5,105,927 4/1992 Frost .

Primary Examiner—Richard M. Lorence
Attorney, Agent, or Firm—Watson Cole Stevens Davis, P.L.L.C.

[57] ABSTRACT

A synchronizing arrangement for a gear transmission includes a synchronizing ring and the surrounding annular spring, the ring having at least three equally spaced support elements at the circumference of the ring at which the spring is snugly supported with a press-fit about the ring. The support elements and the spring define opposing contact surfaces which are relatively adjustable upon assembly of the annular spring about the ring in order to balance manufacturing tolerances.

5 Claims, 6 Drawing Sheets

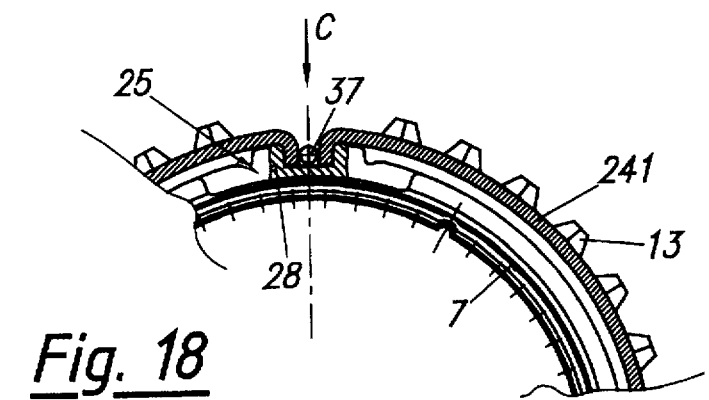
Fig. 18
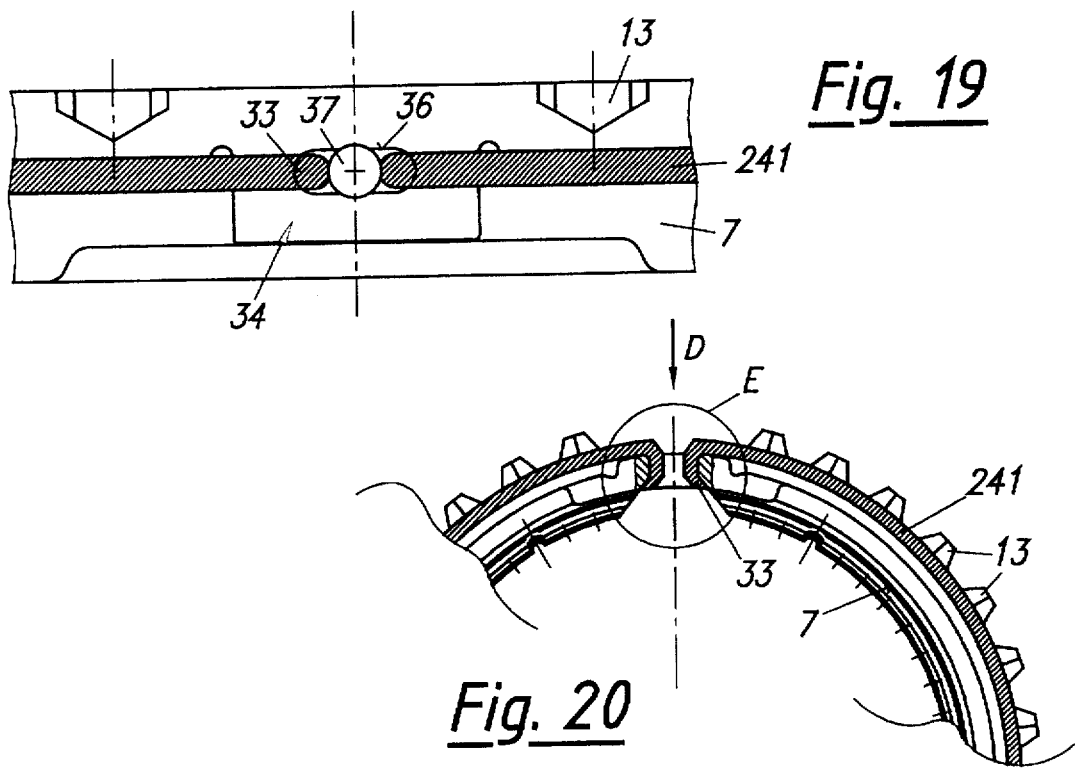
Fig. 19
Fig. 20
Fig. 22
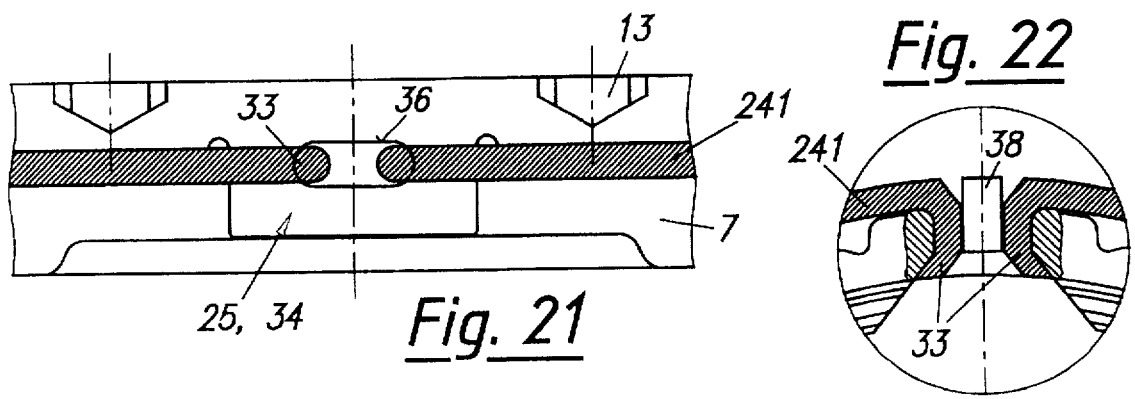
Fig. 21

SYNCHRONIZING ARRANGEMENT FOR A GEAR TRANSMISSION

BACKGROUND OF THE INVENTION

This invention relates generally to a synchronizing arrangement for a gear transmission, which includes a synchronizing ring and a surrounding annular spring, the ring having at least three equally spaced support elements at the circumference of the ring at which the spring is snugly supported with a press-fit about the ring.

Synchronizing devices for transmission gears, in particular those for motor vehicles, presently include clutch sleeves essentially located along the outer circumference of the essentially disk-shaped synchronizing element. Adjustment to the side to initiate a switching operation causes initially a frictional cooperation of the synchronizing ring coupled with the synchronizing body or the drive shaft with a coordinated friction surface which is connected to the gearwheel that must be driven, which then results in the required speed adjustment prior to positive coupling. The adjustment elements or slide rings for such known elements that initiate the axial adjustment of the synchronizing ring, which starts the frictional coupling, are usually supported on the synchronizing elements with three spring bolts, helical springs, or the like, which are equally spaced apart about the circumference of the ring Thus, the positive coupling does not reliably occur until after the speed adjustment via the positive coupling.

Various synchronizing devices with synchronizing rings of the aforementioned type have been developed to avoid the disadvantage of a complicated arrangement with numerous parts, and having the aforementioned adjusting elements along the circumference, which are triple supported relative to the synchronizing element. Examples of such devices are as disclosed in U.S. Pat. Nos. 3,700,083 and 4,732,247 and 5,105,927, in which the annular spring surrounding the synchronizing ring is designed to initiate the positive coupling through the outer clutch sleeve or similar part. After overcoming the spring force between the support elements, spaced a predetermined distance along the circumference, the positive coupling can take place similarly as described above.

Even though the known arrangements require fewer components, which considerably simplifies the production, assembly and maintenance, such arrangements suffer from the disadvantage that for a reliable function of the synchronizing device, a precise cooperation of the annular ring, supporting elements and adjustment elements is necessary because otherwise there is the danger that the positive pre-synchronization that is essential for the function may not take place or only insufficiently. In practical operation, this means that essentially the synchronizing rings and annular springs, which are installed together, must be selected in pairs or must be processed with small tolerances to the required dimensions, for example through grinding, which is costly and time consuming.

SUMMARY OF THE INVENTION

It is therefore an object of the present invention to provide a synchronizing arrangement for a gear transmission, comprising a synchronizing ring and a surrounding annular spring of the aforementioned type but arranged in such a manner that the aforementioned disadvantages of the known embodiments are avoided and, in particular, that the production and assembly of such arrangements according to the invention are simplified without causing any reduction in function.

In accordance with the invention, the directly opposing support areas of the support elements and the annular spring are adjustable relative to one another during assembly in order to balance out production tolerances. In such manner and quite simply, it can be assured during the respective assembly of the synchronizing ring and the annular ring that the required accuracy with respect to dimensions and, if necessary, also with respect to spring forces can be effected easily and economically.

According to one embodiment of the invention, an endless and continuous annular spring is provided, and the contact surfaces of the supporting elements at the synchronizing ring are adjustable at least radially and may be permanently deformable during mounting. With synchronizing rings of solid material, the contact surfaces of the supporting elements are adjustable during the mounting of the annular spring by deformation from the side or from inside the support elements to fit against the annular spring. With synchronizing rings of molded sheet metal, the support elements according to the invention can be formed during the deformation of the synchronizing ring or by a deformation from the side and can then be adapted to the placed-on annular spring during one of the deformation steps.

With the aforedescribed measures, the fitting together of mounted annular spring with synchronizing ring can be assured in a simple and economical manner, without requiring complicated selection methods or the fine machining of components to tolerances.

For split annular springs, having confronting terminal ends, the annular spring ends are adjustable relative to one another during the mounting of the spring on the synchronizing ring so as to adjust the contact surfaces of the supporting elements along the circumference such that they can be attached to the synchronizing ring. Permanently deformable holding members can be provided for fixing the spaced distance of the open ends of the annular spring for such a holding member being provided on the synchronizing ring.

It is thus assured that the split or open annular springs, which are easy to handle with respect to production and mounting, can be used advantageously in carrying out the invention.

Further according to the invention, the annular spring is held captive on the synchronizing ring by means of a permanently deformed holding area, such that it forms a structural component. In such manner, the assembly or mounting of the total synchronizing device is rendered much easier because only a single structural component must now be handled, without the danger of assembly errors.

Other objects, advantages and novel features of the invention will become more apparent from the following detailed description of the invention when taken in conjunction with the accompanying drawings.

BRIEF DESCRIPTION OF THE DRAWINGS

FIG. 18 is a view similar to FIG. 3 of yet another embodiment according to the invention;

FIG. 19 is enlarged partial view taken along the arrow C of FIG. 18;

FIG. 20 is a view similar to FIG. 18 of another embodiment according to the invention;

FIG. 21 is an enlarged partial view taken along the arrow B of FIG. 20; and

FIG. 22 is an enlarged detail view E from FIG. 20.

DETAILED DESCRIPTION OF THE INVENTION

Figure 1:
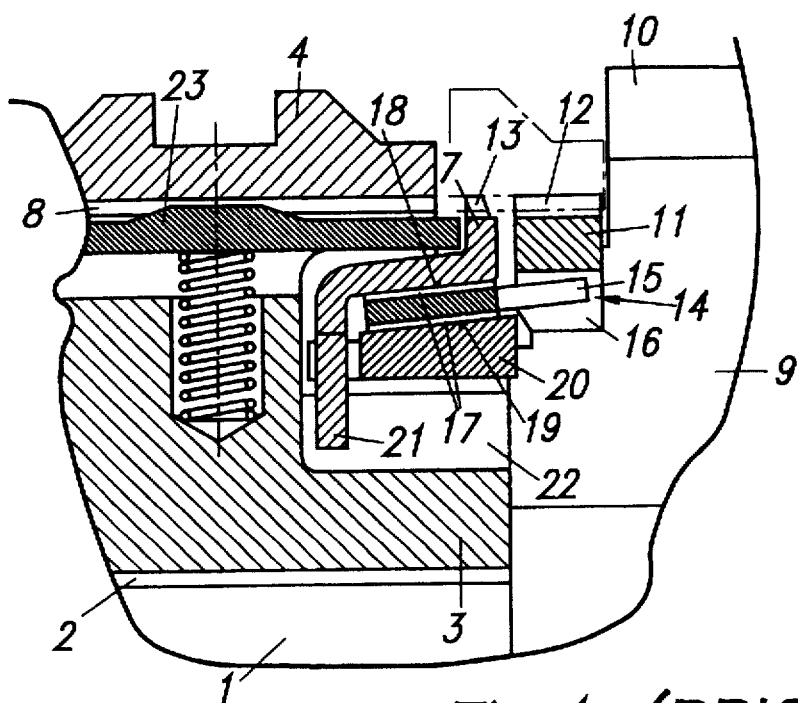
FIG. 1 is a sectional view of part of a known synchronizing device for a gear transmission.

The synchronizing device shown in FIG. 1 has a synchronizing element 3, arranged on a gear shaft 1 with toothing 2 such that synchronizing ring 7 cannot rotate relative to the gear shaft. On its outer circumference the synchronizing element has a clutch sleeve 4 with which a gear shift lever (not shown) engages, and has a stop device comprising a bolt 5 and a spring 6. An outer synchronizing ring 7 is arranged at the side of synchronizing element 3, ring 7 having toothing 13 on its; outer circumference which corresponds to inner toothing 8 of clutch sleeve 4. An escape wheel 9 is arranged such that it freely rotates on gear shaft 1, with the wheel having toothing 10 on its outer circumference. Connected to escape wheel 9 such that it cannot rotate is a ring-shaped clutch disk 11 located on the side facing synchronizing element 3, which disk (or cam) has an outer toothing 12 which meshes with the inner blocking toothing 8 of clutch sleeve 4 if the clutch sleeve is moved correspondingly to the position shown in phantom outline in FIG. 1, the same way the outer toothing 13 of outer synchronizing ring 7 takes place.

Clutch disk 11 makes a snug press-fit with escape wheel 9, such as via toothing, laser welding, etc., and is connected to synchronizing element 3 via a friction clutch that can be moved in or out as required. This friction clutch has a friction ring 14 that forms a structural component by itself and has a pulling cam 15 projecting outwardly at the larger diameter side of ring 14 into a matching recess 16 on clutch disk 11. On each conical outside and inside surface, friction ring 14 has a friction layer 17 that can, for example, be sintered on and which operates jointly with the corresponding conical friction or clutch surfaces 18, 19 of outer synchronizing ring 7 or with an additional inner synchronizing ring 20.

Outer synchronizing ring 7 may be in the form of a deep-drawn sheet metal part, which has the aforementioned outer toothing 13 on its outer circumference and which has the conical friction surface of clutch surface 18 in its central area. On the inside circumference, in the area of the deep-drawn bottom, pushed-out locking cams 21 are provided for a form-fitting, non-rotating connection to synchronizing element 3 which cams engage in respective recesses 22 of synchronizing element 3. Inner synchronizing ring 20 is connected to synchronizing element 3 via locking cams 21 for additional shorter coupling cams (not shown) of outer synchronizing ring 7. This effects a so-called double synchronizing that has many advantages. On the side of synchronizing element 3, i.e., the left side in FIG. 1, a similar arrangement for synchronizing another escape wheel can be arranged on gear shaft 1.

If clutch sleeve 4 is moved, for example, toward escape wheel 9 by overcoming the stop formed by bolt 5 and spring 6, then it carries along outer synchronizing ring 7 via slide rings 23 and comes to rest after a short movement with its clutch surface 18 on the friction surface for friction ring 14, which has friction layer 17. As a result, friction ring 14 is also pushed somewhat to the right in the illustration, so that even the opposing friction layer 17 on the inside surface of friction ring 14 comes into frictional contact with inner synchronizing ring 20. A friction moment is generated (pre-synchronization) that is caused by the spring-loaded slide rings 23, so that outer synchronizing ring 7 relative to synchronizing element 3 reaches the position necessary for the main synchronization. The adjustment of the speed and also the main synchronization then takes place via the clutch sleeve/synchronizing toothing.

The elements which initiate or block the actual axial displacement of the synchronizing rings 7 or 20 for initiating the frictional coupling, which are with such known arrangements generally supported on a synchronizing element 4 via three spring pins, helical springs, or the like, which are equally spaced apart a distance of 120° along the circumference of the ring, results in a relatively complex arrangement with many parts.

Figure 2:
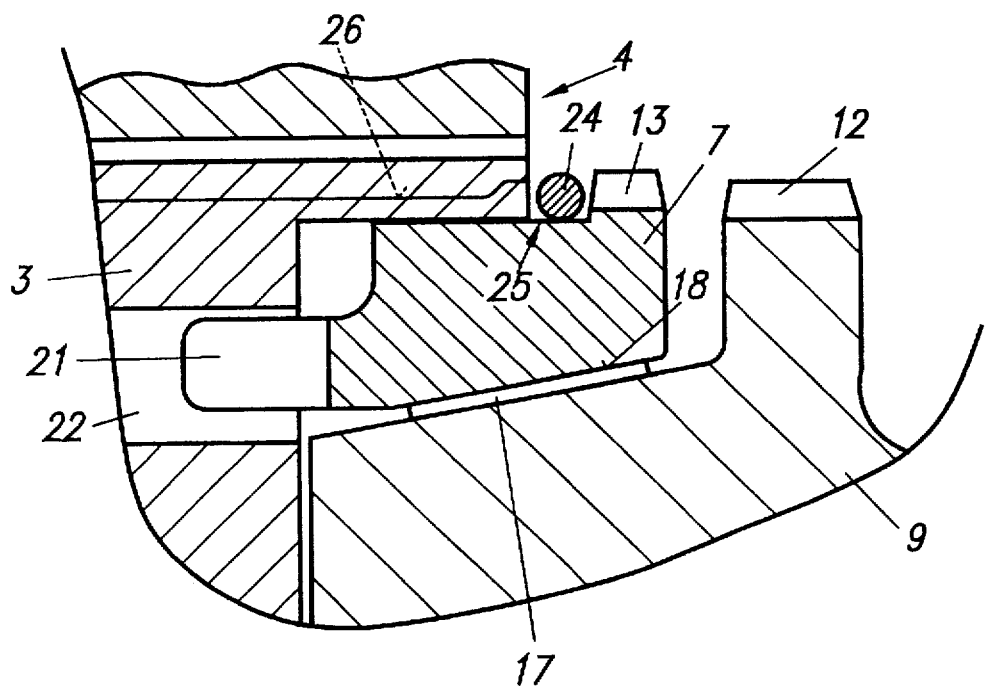
FIG. 2 is a sectional view showing a part of a synchronizing device based on the prior art, wherein a synchronizing ring with an annular spring of the type according to the invention is utilized.
Figure 3:
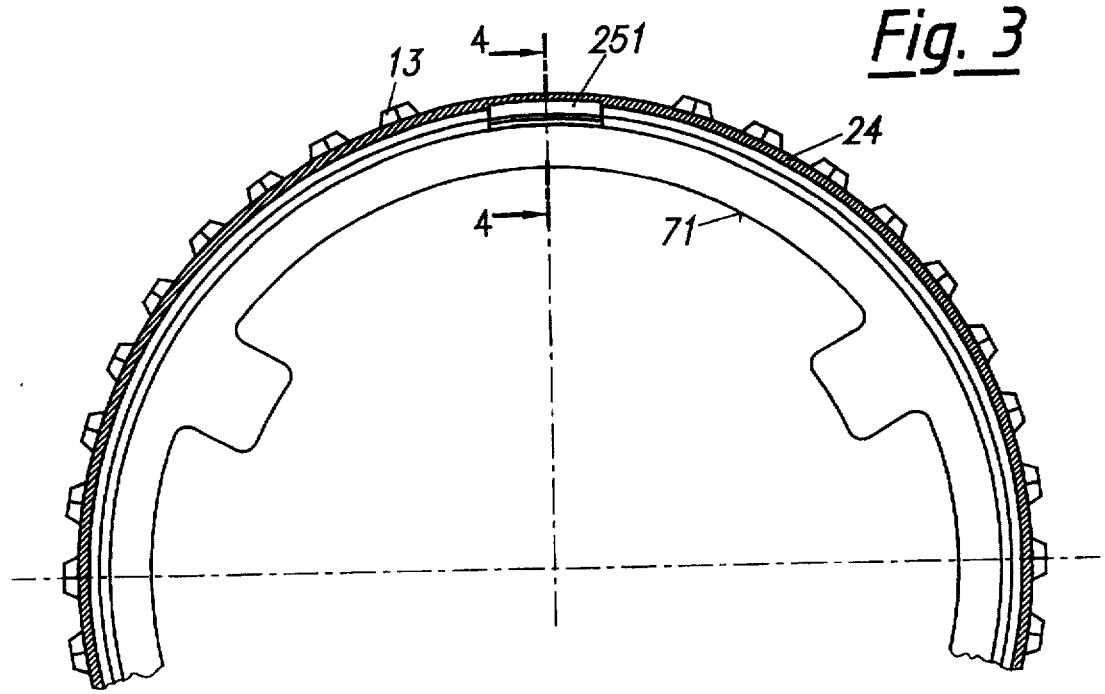
FIG. 3 is a partial view of the synchronizing arrangement according to the invention, comprising a synchronizing ring and an annular spring which is utilized, for example, in an arrangement similar to that shown in FIG. 2.

To avoid the disadvantages of such an arrangement, embodiments of synchronizing devices with synchronizing rings of the aforedescribed type are known in recent years, for which, as shown in FIG. 2, an annular spring 24 that surrounds synchronizing ring 7 functions to initiate the frictional coupling through outer clutch sleeve 4 of synchronizing element 3, or a similar part. After overcoming the spring force between the support elements that are arranged along the circumference at a distance, the form-fitting coupling between synchronizing element 3 and escape wheel 9 can take place in a similar manner as; described with reference to FIG. 1.

It should be noted that the section according to FIG. 2 in the area of outer synchronizing ring 7 is made through one of, for example, three supporting elements 25 equally spaced apart a distance of 120° about the circumference of the ring. Between the spaced apart support elements 25, annular spring 24 is unsupported relative to synchronizing ring 7 and can therefore deform itself radially inwardly under the effects of heightened, elongated teeth 26 along the partial recessed inner toothing 8 of clutch sleeve 4. Only after that can the clutch sleeve be moved fully to the right for a form-fitting engagement of toothings 8, 13 and 12.

Even though this known type of pre-synchronizing according to FIG. 2 requires considerably fewer structural components compared to that of FIG. 1, it has the disadvantage that for a reliable function of especially the pre-synchronizing a very precise cooperation of annular spring 24, support elements 25 and clutch sleeve 4 is required. Otherwise, there is the danger that the frictional pre-synchronizing does not take place at all, or is insufficient. In practical operations, this means that the synchronizing rings and annular springs that are actually installed together must be selected either in pairs to fit together or must be machined with small tolerances to fit, for example, through grinding, which is no less expensive.

To avoid these drawbacks, the synchronizing arrangement according to the invention includes different embodiments of synchronizing rings 71,72,73,74 and annular spring 24, shown respectively in FIGS. 3 to 7. With such an arrangement, the confronting contact surfaces 271,281;272, 282;273,283;274,284, respectively, of support elements 25 and annular ring 24 can be adjusted relative to one another during assembly in order to balance the production tolerances. This is effected, for example, as shown in the drawings in that contact surfaces 271,272,273,274 of support elements 251,252,253,254 at the respective synchronizing rings 71,72,73,74 are radially adjustable, and can be deformed permanently during assembly.

For the embodiments shown in FIGS. 3 to 7, and 8 to 12 of synchronizing rings formed as molded sheet metal parts with closed annular springs 24, the support elements can be formed and/or fitted to the installed annular spring 24 during an intermediate or final step of the deformation of the synchronizing rings. Attempts could be made during the deformation step toward holding annular spring 24 by means of a permanently deformed holding area, which at the same time can be the aforementioned contact surface area on the supporting element on which synchronizing ring 7 is held captive by forming a structural component.

Figure 4:
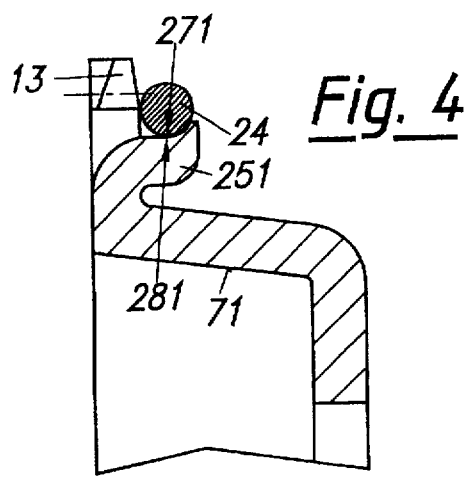
FIG. 4 is a sectional view taken substantially along the line 4—4 of FIG. 3 showing one embodiment according to the invention.

As shown in FIG. 4, several brackets forming supporting elements 251 are bent in such a manner to the side of clutch sleeve 4 (not shown), on the outer diameter on synchronizing ring 71 and between a pair of spaced teeth of blocking toothing 13 (FIG. 3), that the annular spring (shown as having a circular cross-section, but not necessary) is radially centered and in cooperation with the blocking toothing or toothed ring contact surface is axially locked in place.

Figure 5:
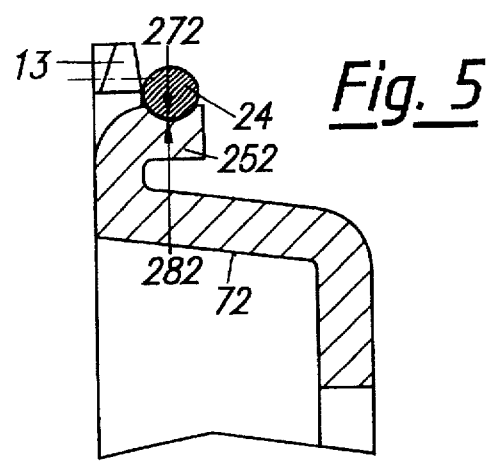
FIGS. 5, 6 and 7 are views similar to FIG. 4 of other embodiments according to the invention.

According to FIG. 5, several brackets distributed across the circumference are bent toward the clutch sleeve side and define supporting elements 252. In contrast to FIG. 4, contact surface 272 is in the form of a groove formed in several or all of the brackets, which ensures the centering and axial positioning of annular spring 24.

Figure 6:
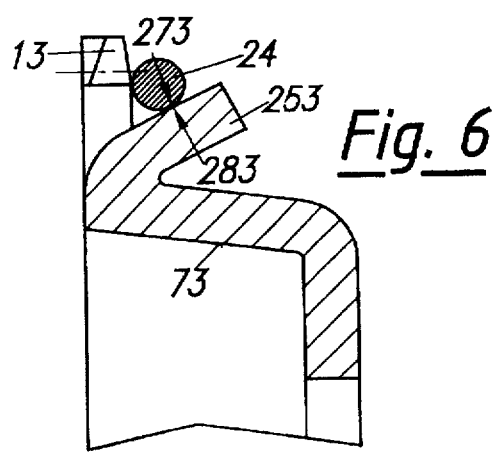

According to FIG. 6, several brackets equally distributed along the circumference of synchronizing ring 73 are bent to form supporting elements 253 to the side, slanted toward the side of the clutch sleeve, in such a manner that annular spring 24 is axially locked in place in the center as well as by engaging the blocking toothing or the toothed ring contact surface.

Figure 7:
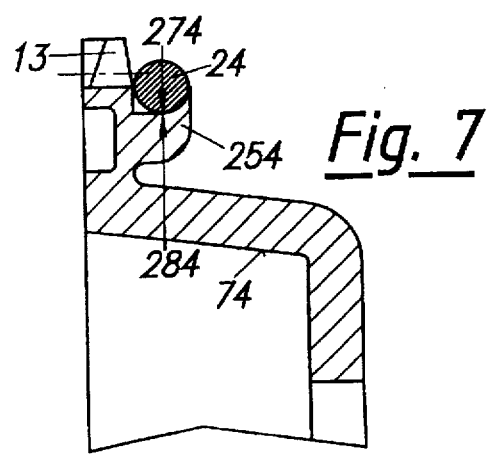

According to FIG. 7, on the toothed ring web for synchronizing ring 74, from the side of the escape wheel (not shown) toward the side of the clutch sleeve (i.e., in the illustration from the left to the right), several cams that are distributed over the azimuth are formed as supporting elements 254 by stamping them out, in such a manner that they center annular spring 24 with optional cross-section as such and lock the same in place together with the toothed ring contact surface.

Figure 8:
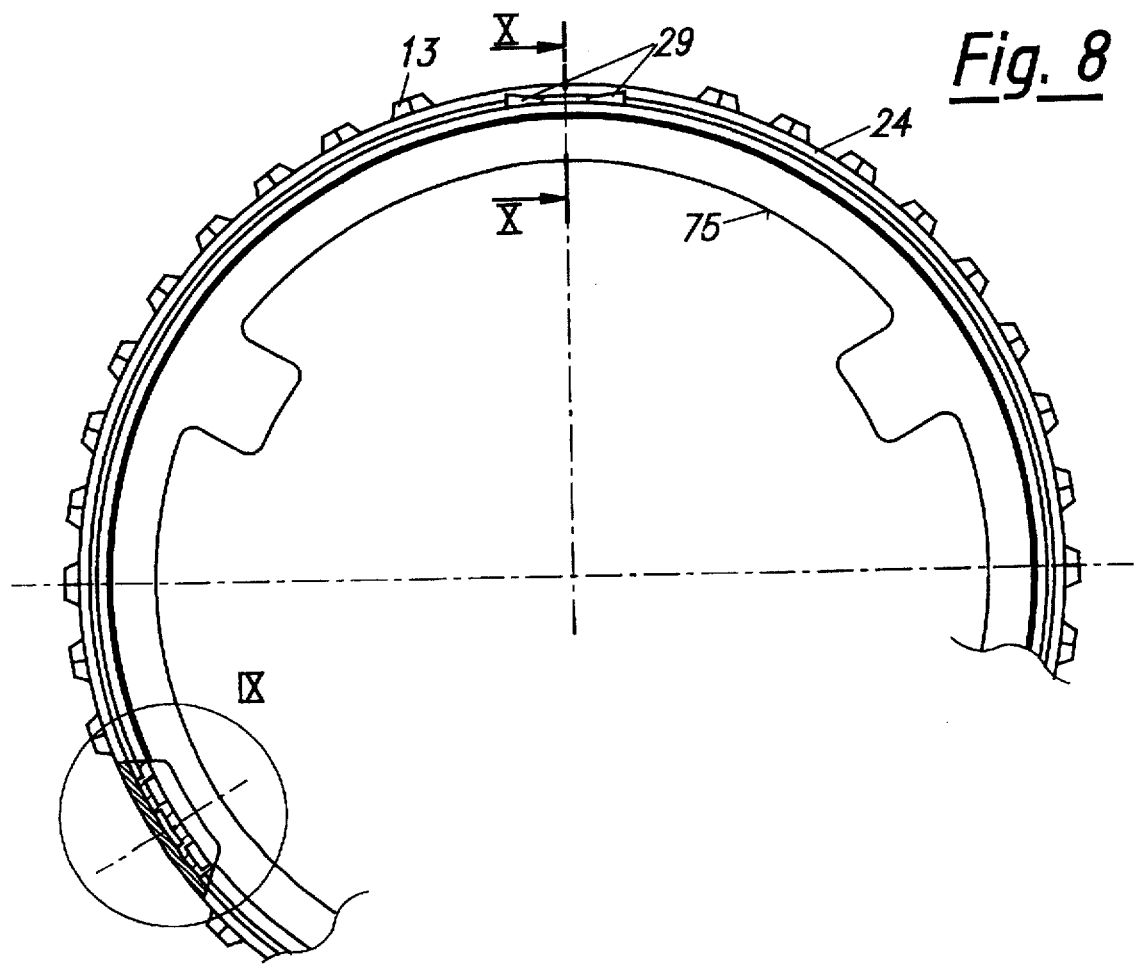
FIG. 8 is a view corresponding to FIG. 3 of another embodiment according to the invention.
Figure 9:
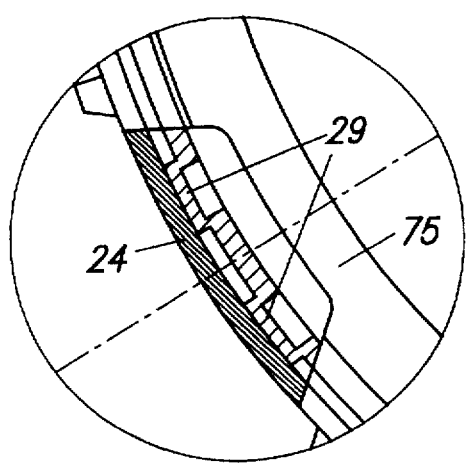
FIG. 9 is a view showing the enlarged detail IX in FIG. 8.
Figure 10:
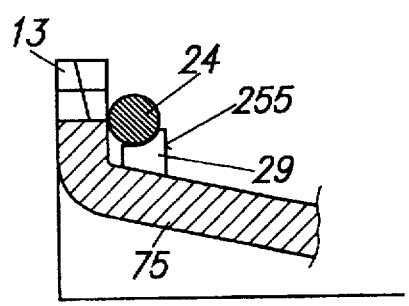
FIG. 10 is a partial sectional view taken substantially along the line X—X of FIG. 8.

In the FIG. 10 embodiment, several cams 29 are formed as supporting elements 255 by punching them out in pairs from the inner face toward the outer face of ring 75, the cams being distributed about the circumference of synchronizing ring 75, as shown in FIGS. 8 and 9. These cams 29 serve the purpose of positive positioning, centering and together with the toothed ring contact surface, axial fixing of annular spring 24.

Figure 11:
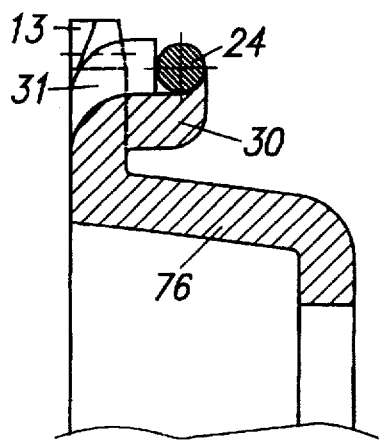
FIGS. 11 and 12 are sectional views showing of FIG. 10.

According to the FIG. 11 embodiment, at least three groups of brackets are distributed about the circumference of synchronizing ring 76, each bracket group comprising a pair of spaced individual brackets 30 and an intervening individual bracket 31, each of which are bent at the outer circumference of synchronizing ring 76 in the direction of the clutch sleeve (i.e., to the right). The pair of spaced outer brackets 30 are formed such that they center annular spring 24 as well as position it axially. Bent bracket 31 in the center of each of the group of three brackets functions to axially fix annular spring 24.

Figure 12:
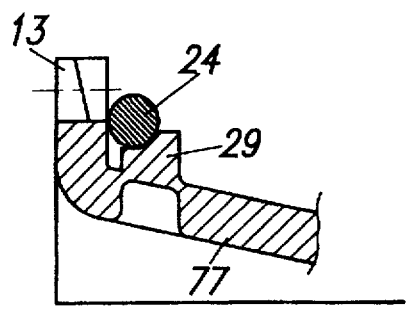

According to the FIG. 12 embodiment, and similar to FIG. 10, annular spring 24 is held in place and centered by means of stamped-out cams 29 in ring 77. However, only a single cam, at each of the three locations spaced about 120°, is stamped from the outer face of the ring, instead of the pair of cams according to FIG. 10.

Figure 13:
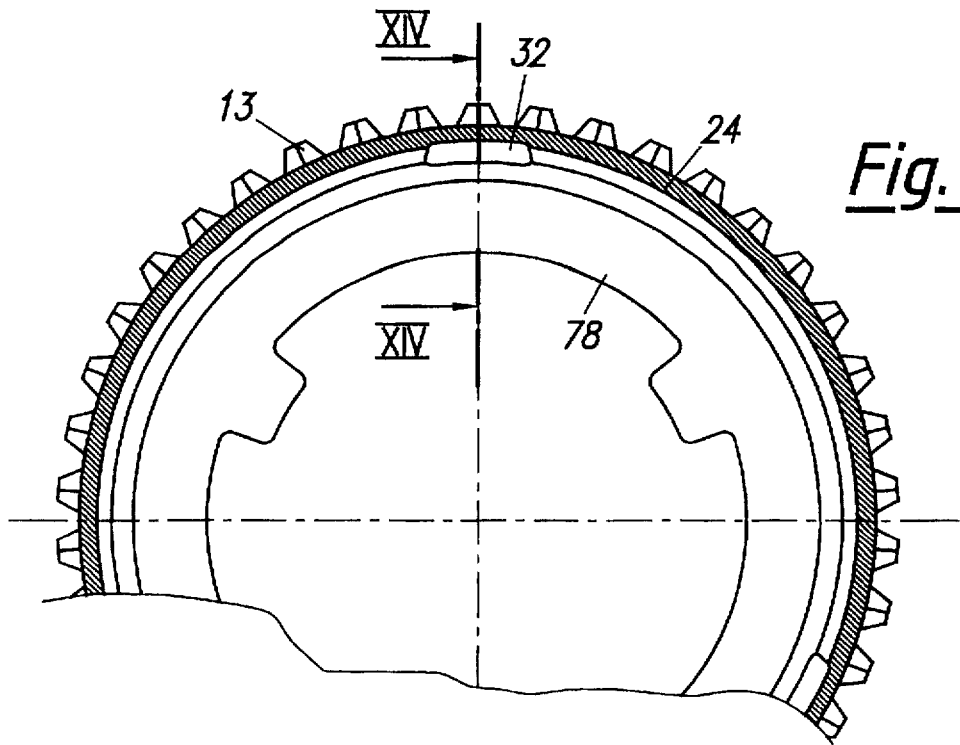
FIG. 13 is a view similar to FIG. 3 according to another embodiment to the invention.
Figure 14:
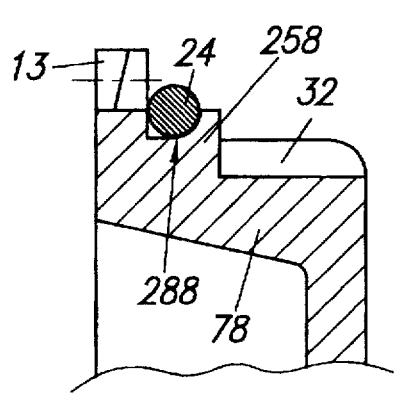
FIG. 14 is an enlarged sectional view taken substantially along the line XIV—XIV of FIG. 13.

Synchronizing ring 78 according to the FIGS. 13, 14 embodiment is made of solid material and includes a closed or continuous annular spring 24. Ring 78 can be shaped either as a sheet-metal deformation ring or may be of solid material, wherein the contact areas 288 for supporting elements 258 can be adapted to annular spring 24 upon deformation, during the mounting of annular spring 24. Supporting elements 258 are produced by stamping or material displacement from area 32.

In the embodiments according to FIGS. 15 to 22, the synchronizing arrangement comprises synchronizing ring 79 and a split annular spring 24 having confronting terminal ends. The open ends 33 of the annular spring upon mounting the same on synchronizing ring 79 are capable of being adjusted relative to one another in order to adapt them along the circumference to the contact surfaces of the various supporting elements and can be fixed at synchronizing ring 79. To fix the ends 33 of split annular spring 241, holders 34 are provided on synchronizing ring 79 which can be deformed permanently to define such holders.

Figure 15:
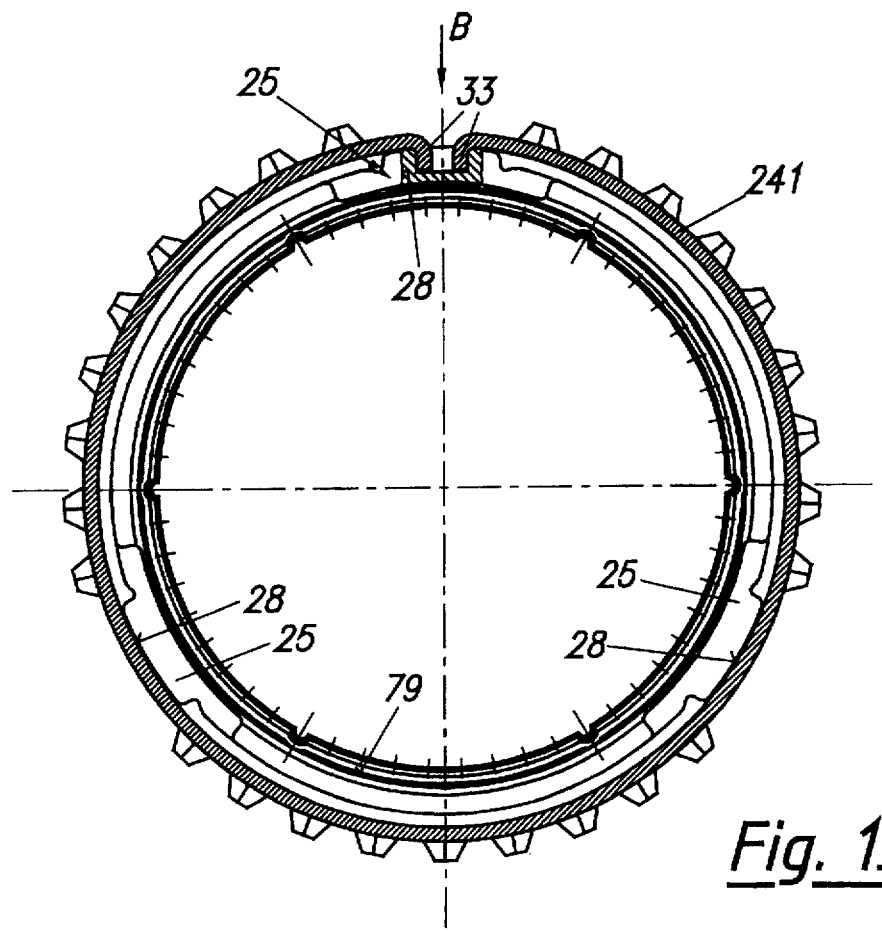
FIG. 15 is a view similar to FIG. 3 of another embodiment according to the invention.
Figure 16:
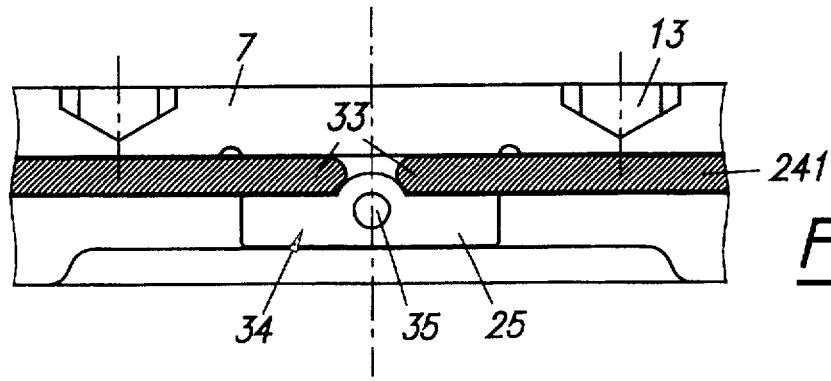
FIGS. 16 and 17 are enlarged detail views taken along the arrow B of FIG. 15.
Figure 17:
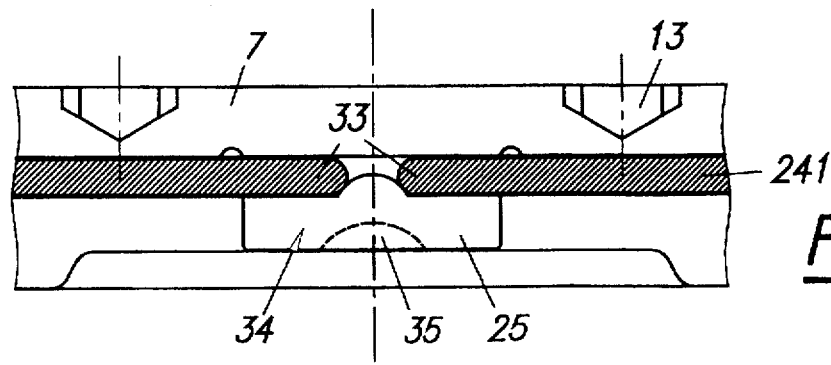

As shown in FIGS. 15 and 16, ends 33 of annular spring 241 are fixed through stamping (stamping-out 35) of holder 34 that forms supporting elements 25, which results in annular spring 24 functioning as an essentially closed spring. Engraving 35 formed radially from the top according to FIG. 16, is substituted according to FIG. 17 by such an engraving made axially from the side. In both cases, ends 33 of annular spring 24 are fixed in the previously elongated-hole type recess.

According to FIGS. 18 and 19, fixation of ends 33 of annular spring 24 in an elongated-hole type recess 36 of holder 34 can be effective by pressing an insert 37 between the ends of the annular spring after it is suspended. This insert 37 can, for example, be in the shape of a ball, rod, cone, etc.

In the FIGS. 20 to 22 embodiment, ends 33 of annular spring 24 in the elongated-hole shaped recess 36 can either be crimped from the inside during mounting or can be fixed in place with the use of an additional pin 38 (see FIG. 22).

Obviously, many other modifications and variations of the present invention are made possible in the light of the above teachings. It is therefore to be understood that within the scope of the appended claims the invention may be practiced otherwise than as specifically described.

What is claimed is:

1. A synchronizing arrangement for a gear transmission, comprising a synchronizing ring and a surrounding annular spring, said ring having at least three equally spaced support elements at the circumference of said ring at which said spring is snugly supported with a press-fit about said ring, said support elements and said spring defining opposing contact surfaces, means for relatively adjusting said opposing contact surfaces upon assembly of said spring about said ring in order to balance manufacturing tolerances.

2. The arrangement according to claim 1, where said annular spring comprises an endless spring element, said means for adjusting said contact surfaces of said spring comprising said support elements being radially adjustable and permanently deformable.

3. The arrangement according to claim 2, wherein said support elements are adjustable inwardly of said supporting elements.

4. The arrangement according to claim 1, wherein said annular spring comprises a split spring element presenting spaced apart confronting terminal ends, said means for adjusting said contact surfaces of said support elements comprising a holder for maintaining said ends at a fixed spaced apart distance.

5. The arrangement according to claim 4, wherein said holder for maintaining said ends at the fixed spaced apart distance comprises a permanently deformable member.

* * * * *